United States Patent [19]

Köhler

[11] Patent Number: 5,115,236
[45] Date of Patent: May 19, 1992

[54] REMOTE CONTROL SYSTEM USING A WAKE UP SIGNAL

[75] Inventor: Hans E. P. Köhler, Eindhoven, Netherlands

[73] Assignee: U.S. Philips Corporation, New York, N.Y.

[21] Appl. No.: 264,489

[22] Filed: Oct. 28, 1988

[30] Foreign Application Priority Data

Nov. 18, 1987 [NL] Netherlands .................. 8702749

[51] Int. Cl.⁵ ............................................. G08C 19/00
[52] U.S. Cl. ..................... 340/825.69; 340/825.72; 358/194.1; 359/142
[58] Field of Search .............. 340/825.31, 825.34, 340/825.44, 825.45–825.48, 825.69, 825.72, 543, 636; 455/603; 379/88; 358/194.1

[56] References Cited

U.S. PATENT DOCUMENTS 4,143,368  3/1979  Route et al. .................. 455/603 X
4,413,261  11/1983  Greenberg .................. 340/825.69 X
4,704,735  11/1987  Swapp et al. .............. 340/825.72 X

OTHER PUBLICATIONS

M. M. Mano, "Computer System Architecture", 1982, Prentice-Hall, Inc. pp. 270–271.
H. D. Toong, "Microprocessors", Scientific American, Sep. 1977.

*Primary Examiner*—Ulysses Weldon

[57] ABSTRACT

A two-way remote control system suitable for use with a plurality of apparatus, the system including a hand held unit comprising a transmitter and a receiver, each transmitted message in the system comprising a series of pulses and the beginning of each message having a wake-up pulse which switches a receiver from a rest-state to an operative-state, the receiver switching back to the rest-state if no wake-up pulse has been received for a certain period.

4 Claims, 2 Drawing Sheets

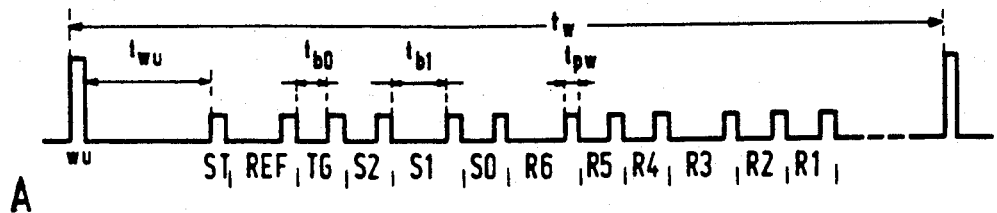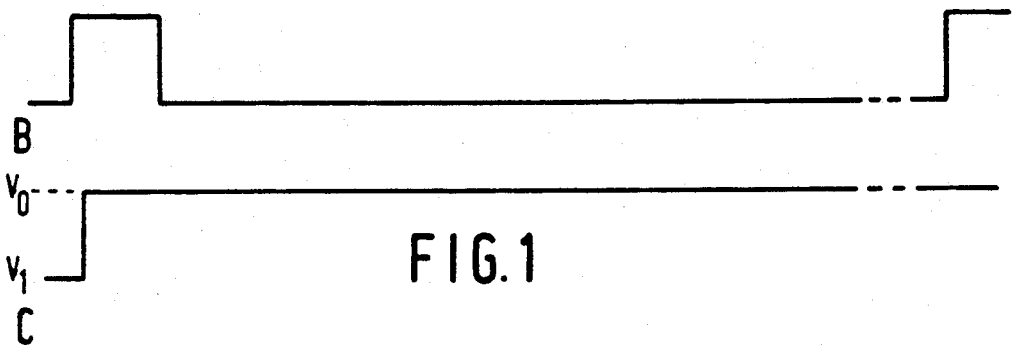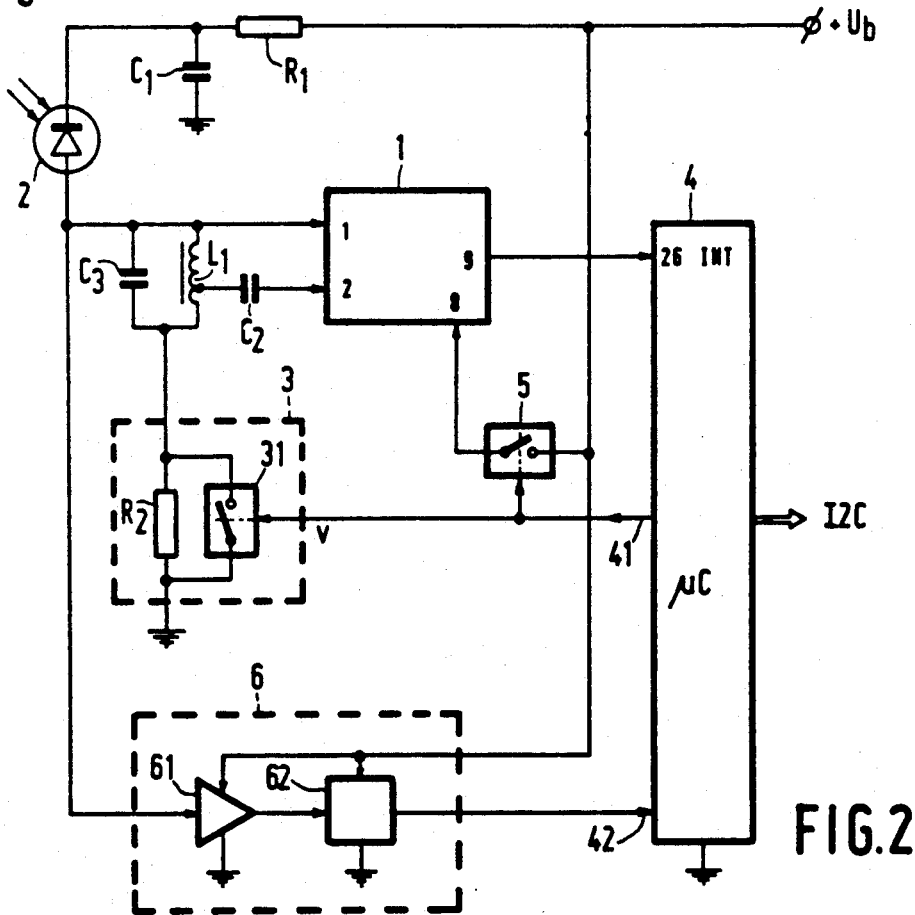

REMOTE CONTROL SYSTEM USING A WAKE UP SIGNAL

A. BACKGROUND OF THE INVENTION

A(1) Field of the Invention

The invention relates to a system comprising one or more transmitters and receivers for the transmission of messages. The system is particularly intended as a remote control system for setting a variety of functions of one or more apparatus each comprising such a receiver for this purpose.

Such a system will hereinafter be referred to as RC system, a transmitter used therein will be referred to as RC transmitter and a receiver will be referred to as RC receiver.

It is to be noted that an apparatus may herein be understood to mean a TV receiver, a video recorder, a teletext decoder, an audio amplifier, an audio tuner, a luminaire, a door, etc.

A(2) Description of the Prior Art

In a remote control system the RC transmitter is provided with a message generator which upon request delivers a message in the form of a series of pulses. For the transmittal of such a series of pulses an infrared modulation circuit is provided which comprises an infrared LED whose emitted infrared light is modulated by these pulses.

More particularly, each message comprises an address word indicating for which apparatus the message is intended and a command word indicating which function of the selected apparatus must be set and to which value it must be set. An address word and a command word combined are unique for the message to be transmitted.

The RC receiver is provided with an infrared demodulation circuit comprising an infrared photodiode. It converts received infrared light into an electric signal which is a rough version of the transmitted message. This signal is applied to a signal processing circuit for generating a stylized version of the message, that is to say, a version whose form corresponds to the original message, hence with clearly defined pulses.

Embodiments of the above-mentioned RC transmitters and RC receivers have been extensively described in References 1, 2 and 3 defined more particularly, hereinafter. As indicated in these References, the command word and address word in each message is usually preceded by one or more auxiliary pulses such as, for example, a starting pulse. In Reference 3 it is also proposed to transmit a wake-up pulse preceding the starting pulse. Unfortunately, its purpose is not revealed in this publication.

The RC transmitters and RC receivers described in the forementioned References are eminently suitable in practice, at least if they are used in a so-called one way RC system. This is an RC system with a central RC transmitter and, remote therefrom, a plurality of local RC receivers. The central RC transmitter forms part of a hand-held unit and is battery-fed, whilst each local RC receiver forms part of an apparatus to be operated and is usually fed from the mains.

In recent years apparatus to be operated have increasingly been provided with a local RC transmitter so that such an apparatus can also transmit messages to either a local RC receiver or to the hand held unit which is then provided with a central RC receiver. In this way, in response to a message transmitted by the central RC transmitter, a local RC transmitter can transmit a reply message intended for the central RC receiver which processes this reply message and notifies the user, for example, by means of a piece of information on a display.

Such a system is referred to as a two-way remote control system. In addition to the above-described situation in which the local RC transmitter transmits a message in response to a message received from the central RC transmitter the aim is to provide apparatus with a facility for transmitting messages autonomously. Since it is then not known in advance when an apparatus transmits a message, all RC receivers will have to be continuously in an operative state. For the currently used RC receivers this implies that approximately 50 mAh is consumed every 24 hours. This is no drawback for those RC receivers receiving their energy from the mains, but it is admissably high for RC receivers receiving their energy from a battery, such as the central RC receiver in the hand held unit. In fact, the present-day batteries have an energy content of approximately 480 mAh so that in a two-way RC system the batteries in the hand held unit will be exhausted after approximately one week. This is in contrast to a one-way RC system in which the batteries in the hand-held unit may last as long as four years.

B. OBJECT AND SUMMARY OF THE INVENTION

It is an object of the invention to improve an RC system so as to extend the lifetime of the batteries to a considerable extent, notably in battery-fed RC receivers.

According to the invention there is provided an RC system in which: each RC transmitter is of the type transmitting messages which are constituted by a series of pulses and the beginning of each message is marked by a wake-up pulse;

and in which a receiver comprises:

a wake-up pulse detection circuit which generates an auxiliary wake up pulse in response to each received wake up pulse;

switching means which are coupled to:

a signal processing circuit for selectively applying power supply energy thereto;

a wake-up pulse detection circuit for receiving the auxiliary wake-up pulses;

said switching means applying the power supply energy to the signal processing circuit after having received an auxiliary wake-up pulse and discontinuing this supply if no auxiliary wake-up pulse has been received for a predetermined period.

REFERENCES

1. Low-power remote control IR transmitter and receiver preamplifiers; Philips' Electronic Components and Materials; Technical publication 167 dated Mar. 22, 1985.

2. Sparsamer Infrarot Fernbedienungsgeber; Funk-Technik 37, Vol 9, 1982 pages 380–384.

3. PCM remote control chips detect transmission errors; Electronic Engineering, April 1983, pages 41–47.

4. Microcontrollers and peripherals; Philips' Data handbook; Integrated Circuits; Book IC14 1987, pages 233–265, especially 256 and 257.

D. BRIEF DESCRIPTION OF THE FIGURES

FIG. 1 shows the format of a message transmitted by an RC transmitter and some time diagrams to explain the operation of the RC receiver shown in FIG. 2.

FIG. 2 shows an RC receiver according to the invention.

E. EXPLANATION OF THE INVENTION

E(1) Message Format

Figure 3:
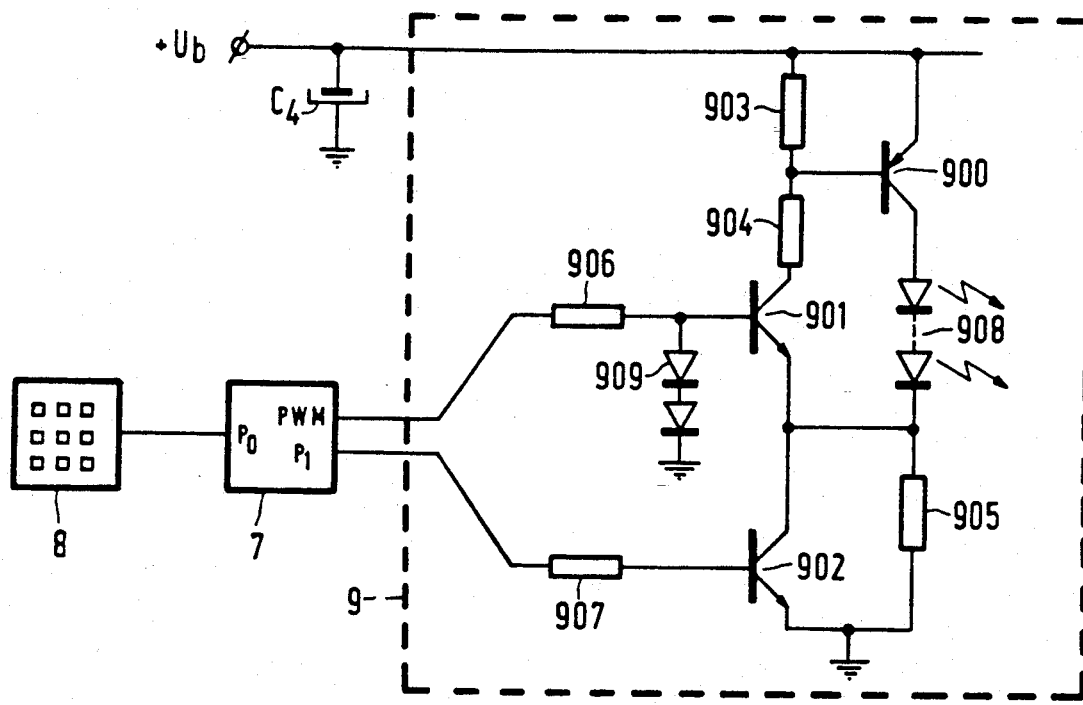
FIG. 3 shows an RC transmitter.

In FIG. 1 a message to be transmitted from an RC transmitter to an RC receiver is diagrammatically shown at A. This message starts with a wake-up pulse WU which is followed after a period $t_{WU}$ by a starting pulse ST which in this embodiment is in turn followed by eleven further pulses spaced apart at different distances and thus defining bits. More particularly, the message comprises a reference bit REF, a so-called toggle bit TG, an address word of three address bits S0, S1, S2 and a command word of six command bits R1, R2, R3, R4, R5, R6. As already stated, the address word indicates the apparatus whose function must be set, whilst the command word indicates which function must be set and what this setting must be like. The functions of reference bit and toggle bit have been extensively described in Reference 1 and are not important for a good understanding of the invention. The function of the wake-up pulse WU will be explained in greater detail. However, in this respect it is, to be noted that this pulse is preferably distinghuised from the other pulses by its energy content. This means that it may be wider than the other pulses, but it is preferably larger, as is indicated at A in FIG. 1.

As has been stated, the spaces between the eleven further pulses define bits. More particularly, a bit having the logic value between "0" is defined by the space $t_{b0}$ of two consecutive pulses and a bit having the logic value between "1" is defined by the space $t_{b1}$ of two consecutive pulses. These spaces are usually expressed in numbers of clock pulse periods $t_{osc}$ of a reference clock. Some characteristic values are:

| | |
|---|---|
| clock frequency of reference clock | $f_{osc}$ = 455 kHz |
| clock pulse period of reference clock | $t_{osc}$ = 32 μs |
| pulse space for logic "0" | $t_{b0}$ = 2240 $t_{osc}$ |
| pulse space for logic "1" | $t_{b1}$ = 3392 $t_{osc}$ |
| width of the pulses | $t_{pw}$ = 64 $t_{osc}$ |
| repetition period of a message | $t_w$ = 55296 $t_{osc}$ |

E(2) RC Receiver

FIG. 2 shows an embodiment of an RC receiver suitable for receiving messages of the format as indicated at A in FIG. 1. The main feature of this receiver is a signal processing circuit 1 which is commercially available as an IC. This embodiment is based on the assumption that this IC circuit 1 is constituted by the TDA 3047 or 3048 so that it largely corresponds to the RC receiver extensively described in Reference 1. It is also provided with a photo-diode 2. Its cathode is connected by way of a cut-off filter comprising a resistor $R_1$ and a capacitor $C_1$ to the positive terminal $+U_b$ of a DC power supply source. The anode of photodiode 2 is directly connected to a pin 1 and by way of a filter circuit and a capacitor $C_2$ to a pin 2 of IC circuit 1. This filter circuit is constituted by a parallel arrangement of a transformer $L_1$ and a capacitor $C_3$, which parallel arrangement is connected to ground by way of a variable resistor 3. IC circuit 1 thus receives at its pin 2 a rough version of the demodulated messages. It is to be noted that photo-diode 2 and filter circuit $L_1$, $C_3$ combined constitute an infrared demodulation circuit.

Variable resistor 3 is constituted by a fixed resistor $R_2$ which can be short-circuited by means of a switch 31 which is shown only symbolically. This is effected under the control of a control voltage v which is supplied by a control voltage output 41 of a control circuit 4 and which can assume the values $V_0$ and $V_1$. If the value is $V_0$, for example, $R_2$ is short-circuited, and if it is $V_1$, $R_2$ is not short-circuited. This control voltage is also used for controlling a switch 5, also shown only symbolically, by which the supply voltage of the DC power supply source can be applied to supply pin 8 of the IC circuit 1. If more particularly the control voltage v is equal to $V_0$, supply pin 8 receives a supply voltage and the RC receiver is in the operative state. IC circuit 1 now operates in the way as described in Reference 1 and supplies from its output pin 9 a stylized version of each received message in the form of a data flow comprising the address words and command words. However, if the control voltage v is equal to $V_1$, the IC circuit 1 does not receive a supply voltage and $R_2$ is not short-circuited. The RC receiver is now in its rest state.

To bring the RC receiver from the rest state to the operative state, the anode of photo-diode 2 is also connected to the input of a wake-up pulse detection circuit 6. In the embodiment shown this circuit is constituted by an amplifier circuit 61 and a pulse shaper 62. Due to the simple design of this detection circuit 6, it only consumes several micro amperes.

As long as no RC transmitter transmits a message, the control voltage is equal to $V_1$. Consequently resistor $R_2$ is in series with the filter circuit $L_1$, $C_3$ and by choosing a large value of $R_2$, the IC circuit 1 has a very high input impedance which is constituted by this resistor $R_2$ and this filter circuit. Supply pin 8 of IC circuit 1 does not receive a supply voltage. The current consumption is now only determined by the consumption of the wake-up pulse detection circuit and the control circuit 4 and it does not amount to more than several micro-amperes.

As soon as an RC transmitter transmits a message of the format as indicated at A in FIG. 1, the high input impedance of circuit 1 causes the current, which will start flowing through the photodiode 2 as a result of the received wake-up pulse, to be applied substantially only to the wake up pulse detection circuit 6. This circuit thereby supplies from its output the auxiliary wake-up pulse indicated at B in FIG. 1, which pulse is applied to a so called wake-up input 42 of the control circuit 4. In response thereto a voltage $V_o$ is applied to its control voltage output 41 (see C in FIG. 1). Consequently IC circuit 1 receives a supply voltage at its pin 8 and its input impedance will be low due to a short circuit of resistor $R_2$ so that the pulses following the wake-up pulse are completely applied thereto.

In the embodiment shown the data flow occurring at the output pin 9 of IC circuit 1 is also applied to the control circuit 4. It will be assumed that this is performed in such a manner that it can realize a format conversion of the received messages in order to transmit these messages in a bus format to relevant circuits. In the FIG. 2 the output data bus of the control circuit 4 is denoted by I2C.

A microprocessor could be used as control circuit 4. Many commercially available microprocessors are suitable for use in this RC receiver. One example is the microprocessor PCB83 C552 which is marketed by Philips and which is described in Reference 4. When using this microprocessor the auxiliary wake up signal along line 42 is applied to the reset input (pin 15), the data current supplied from pin 9 by IC circuit 1 can be applied to the so-called Interrupt pin (pin 26 or 27) and the control voltage v along line 41 is supplied by an output gate (for example, pin 7).

The microprocessor operates as follows. If no wake-up pulse has been received for a given period, the microprocessor automatically changes the control voltage from $V_o$ to $V_1$ so that the supply of the supply voltage to variable resistor 3 and pin 8 of IC circuit 1 is interrupted. If subsequently no further use is made of the microprocessor for a given period, it switches automatically to the "power down" mode in which it is essentially inactive. As soon as an auxiliary wake-up pulse is received, the microprocessor is reset and in the further course of the program the control voltage v will be changed from $V_1$ to $V_o$ again.

E(3) RC Transmitter

Figure 4:
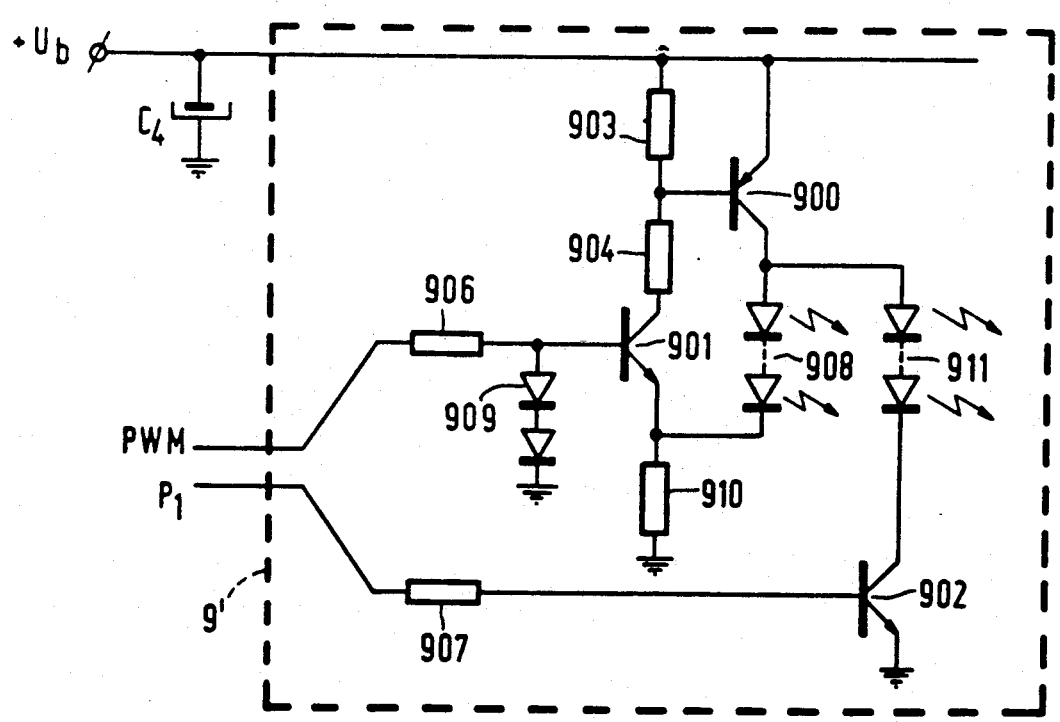
FIG. 4 shows another embodiment of the modulation circuit used in the RC transmitter of FIG. 3.

As is shown in FIG. 1 the wake up pulse is preferably transmitted with a light intensity (amplitude) which is larger than that with which the other pulses defining the message are transmitted. FIGS. 3 and 4 show how this can be realized.

FIG. 3 more particularly shows the overall structure of an RC transmitter. The main feature of this transmitter is a microprocessor 7 which, like the microprocessor 4 in the RC receiver, may be constituted by the PCB 83 C552. In the embodiment shown this microprocessor receives messages from a keyboard 8 which is conventionally connected to the microprocessor by means of the gate $P_0$ available for this purpose. As soon as the depression of a key or a sequence of keys has been signalized, the microprocessor supplies from its output PWM a corresponding pulse series read from a memory, which series characterizes the previously mentioned message. An output gate $P_1$ supplies a pulse (denoted hereinafter as WUP) which occurs simultaneously with the wake-up pulse in the message and which has approximately the same pulse width. Both the pulse series occurring at the output PWM and the pulse WUP are applied to an infrared modulation circuit 9.

In the embodiment shown the infrared modulation circuit 9 is constituted by three transistors 900, 901, 902 (for example Philips' BC 369, BC 548, BC 368, respectively), a number of resistors 903 to 907 (for example, of 3,300 Q, 100 Q, 0.5 Q, 5,600 Q, 820 Q. respectively), a plurality of series-arranged LEDs 908 and a diode pair 909 (for example two diodes of the Phillips' type B A 317). All these elements are interconnected in the manner as is shown in FIG. 3. This modulation circuit is fed by the power supply voltage $+U_b$ by way of a stabilizing capacitor $C_4$ (of, for example, 2000 μF).

This circuit operates as follows. Whenever a pulse occurs in the pulse series occurring at the output PWM of microprocessor, the two transistors 900 and 901 are turned on and a current of approximately 0.8 amperes flows through the LEDs 908. These LEDs supply IR light with an intensity determined by the current (0.8 A) flowing through them throughout the entire duration of this pulse. The current intensity through these LEDs 908 is limited by the value of resistor 905 (in this case 0.5 Q). This resistor 905 is shunted by transistor 902 which is only turned on during the occurrence of the pulse WUP. In that case resistor 905 is short-circuited so that the current through the LEDs 908 increases considerably, resulting in a increase of the intensity of the IR light irradiated by these LEDs.

Another embodiment of an infrared modulation circuit is shown in FIG. 4 and denoted by the reference numeral 9'. It mainly comprises the same components as the infrared modulation circuit 9 of FIG. 3 in which these components are interconnected substantially in the same manner. However, in this embodiment the LEDs 908 are connected to ground by way of a resistor 910 of, for example, only 0.2 Q, whilst the collector lead of transistor 900 is connected to ground by way of a second plurality of series-arranged LED's 911 and transistor 902. With this infrared modulation circuit 9' all transistors are turned on and there are two infrared circuits irradiating IR light with a large intensity as soon as a wake-up pulse occurs at the output PWM of microprocessor 7 (and hence a pulse WUP at output gate $P_1$). No WUP pulse occurs during the other pulses in the pulse series, so that transistor 902 is turned off and the intensity of the irradiated IR light is determined by the current through the LEDs 908, which current is limited by resistor 910.

E(4) General Remarks

For a satisfactory operation of the hand-held unit in a two-way remote control system it appears to be advantageous in practice if an inhibit signal is generated in the RC receiver immediately after the wake up pulse has been received, which inhibit signal ensures that the RC transmitter of the hand-held unit does not transmit a planned message but waits until the entire incoming message has been decoded.

It has been stated in the foregoing that the wake-up pulse is preferably distinguished from the other pulses in the message by its energy content. This is not necessary. To obtain this distinction it is in principle sufficient if the pulse space $t_{wu}$ shown at A in FIG. 1 is considerably larger than $t_{b0}$ and $t_{b1}$.

What is claimed is:

1. A remote control system comprising a transmitter and a receiver for the transmission and reception of messages, in which system said transmitter comprises means for generating messages, each message comprising a series of pulses and the beginning of each message including a wake-up pulse; a modulation circuit for modulating the generated messages; in said system said receiver comprises means for generating power supply energy; a demodulation circuit for demodulating received modulated messages and for generating a rough version of each received modulated message; a signal processing circuit fed by said power supply means and being coupled to the demodulation circuit for receiving the rough versions of messages and generating a stylized version of each message; said receiver also comprising a wake-up pulse detection circuit generating an auxiliary wake-up pulse in response to each received wake-up pulse; and switching means coupled to the signal processing circuit for selectively applying power supply energy thereto; said switching means applying the power supply energy to the signal processing circuit only after an auxiliary wake-up pulse has been generated and discontinuing said supply if no auxiliary wake-up pulse has been generated for a predetermined period, said receiver maintaining said wake-up pulse detection circuit in condition to sense the next transmitted wake-up pulse after each said predetermined period.

2. A transmitter suitable for use in generating messages in a remote control system as claimed in claim 1, the wake-up pulse in each message being distinguished from the other pulses in the series by its energy content.

3. A transmitter suitable for use in a remote control system as claimed in claim 1, the wake-up pulse in each message being distinguished from the other pulses in the series by its amplitude.

4. A remote control system comprising a transmitter and a receiver for the transmission and reception of messages, each message comprising a series of pulses and the beginning of each message including a wake-up pulse; in said system said receiver comprises means for generating power supply energy; a signal processing circuit fed by said power supply and receiving said messages and generating a stylized version of each message; said receiver also comprising a wake-up pulse detection circuit generating an auxiliary wake-up pulse in response to each received wake-up pulse; and switching means coupled to the signal processing circuit for selectively applying power supply energy thereto; said switching means applying the power supply energy to the signal processing circuit only after an auxiliary wake-up pulse has been generated and discontinuing said supply if no auxiliary wake-up pulse has been generated for a predetermined period, said receiver maintaining said wake-up pulse detection circuit in condition to sense the next transmitted wake-up pulse after each such predetermined period.

* * * * *